United States Patent [19]

Kilian

[11] 3,958,948

[45] May 25, 1976

[54] DISSOLVER VESSEL BOTTOM ASSEMBLY

[75] Inventor: Douglas C. Kilian, Kennewick, Wash.

[73] Assignee: The United States of America as represented by the United States Energy Research and Development Administration, Washington, D.C.

[22] Filed: Jan. 8, 1975

[21] Appl. No.: 539,547

[52] U.S. Cl. .............................. 23/271 R; 259/4 R; 134/36; 266/114; 423/4; 23/267 E

[51] Int. Cl.$^{2}$ ....................... B01D 11/02; B01F 1/00

[58] Field of Search ............... 23/272 AH, 271, 267, 23/267 E; 259/4, 18, 36, 180; 75/101 R; 134/36, 104; 266/6 R; 423/4, 20, 249

[56] References Cited

UNITED STATES PATENTS

| | | | |
|---|---|---|---|
| 745,472 | 12/1903 | Adams | 23/271 |
| 1,163,097 | 12/1915 | MacDonald | 23/271 |
| 1,354,850 | 10/1920 | Schneider | 23/271 |
| 1,807,263 | 5/1931 | Walter | 23/272 AH |
| 2,699,379 | 1/1955 | Luque | 23/272 AH |
| 3,307,914 | 3/1967 | Heiss | 23/272 AH |
| 3,385,674 | 5/1968 | Kolasinski | 23/272 AH |
| 3,553,401 | 1/1971 | Janecke | 23/272 AH |

*Primary Examiner*—Stephen J. Emery
*Attorney, Agent, or Firm*—Dean E. Carlson; Arthur A. Churm; Robert J. Fisher

[57] ABSTRACT

An improved bottom assembly is provided for a nuclear reactor fuel reprocessing dissolver vessel wherein fuel elements are dissolved as the initial step in recovering fissile material from spent fuel rods. A shock-absorbing crash plate with a convex upper surface is disposed at the bottom of the dissolver vessel so as to provide an annular space between the crash plate and the dissolver vessel wall. A sparging ring is disposed within the annular space to enable a fluid discharged from the sparging ring to agitate the solids which deposit on the bottom of the dissolver vessel and accumulate in the annular space. An inlet tangential to the annular space permits a fluid pumped into the annular space through the inlet to flush these solids from the dissolver vessel through tangential outlets oppositely facing the inlet. The sparging ring is protected against damage from the impact of fuel elements being charged to the dissolver vessel by making the crash plate of such a diameter that the width of the annular space between the crash plate and the vessel wall is less than the diameter of the fuel elements.

1 Claim, 2 Drawing Figures

DISSOLVER VESSEL BOTTOM ASSEMBLY

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates generally to the reprocessing of nuclear reactor fuel elements to recover the fissile material from spent fuel elements. particularly, the present invention is concerned with the dissolution of the fuel elements as the initial step in the separation and recovery of the fissile materials by liquid extraction techniques. More specifically, the invention concerns the dissolver vessel in which the fuel elements are dissolved into liquid solution and is directed toward an improved bottom assembly for the dissolver vessel.

As is well known in the art, spent nuclear reactor fuel elements are reprocessed in order to recover the valuable fissionable material for reuse as nuclear fuel. In the very commonly used liquid extraction techniques, the fuel elements are dissolved into solution for subsequent separation of the fissionable material from the fission products, cladding material, etc., and ultimate recovery of the fissionable material. At the head-end of such reprocessing schemes there is generally a dissolver vessel in which is carried out the initial step of dissolving the nuclear reactor fuel elements to place the materials in solution for the subsequent liquid extraction separation steps. A particular nuclear fuel reprocessing facility employing these techniques is the Idaho Chemical Processing plant located at the U.S. Atomic Energy Commission's Idaho National Engineering Laboratory, formerly named the National Reactor Testing Station, fissile southeastern Idaho. An understanding of fuel reprocessing and fissible material recovery systems in general and specifically the system in use at this reprocessing facility can be obtained from a more detailed discussion contained in AEC report No. IN-1471 entitled "Zirconium Fuel Reprocessing Campaign of 1960", which report is incorporated herein by reference. While the particular reprocessing scheme described is concerned with zirconium-clad fuel, a similar system and similar equipment is used for the reprocessing of other types of fuel such as aluminumclad fuels. Other reprocessing schemes such as may be used at other facilities also employ similar equipment.

In these reprocessing schemes, the initial step is the introduction into a dissolver vessel of the spent nuclear reactor fuel elements. In order to eliminate unnecessary handling and the difficulty of mechanically lowering the fuel elements into the dissolver vessel, a dissolver vessel has been designed with a charging chute through which the fuel elements are dropped into the dissolver vessel. Prior to charging the dissolver vessel with the fuel elements, water, usually containing a nuclear poison for criticality considerations, is pumped into the dissolver vessel in order to cushion the fall of the fuel elements. However, since the fuel elements are typically dropped from a height of about 28 feet to the bottom of a dissolver vessel, it is necessary that the dissolver vessel be designed with a reinforced bottom to prevent the dropping fuel elements from damaging the integrity of the dissolver vessel. Dissolver vessels have therefore been designed with a sturdy flat bottom, commonly referred to as a crash plate, which permits the dropping of the fuel elements into the vessel.

During the dissolution of the fuel elements, some solids which do not dissolve in the dissolvent are deposited and accumulate in the dissolver vessel, principally falling to the bottom. Difficulties have been encountered in the presently used dissolver vessels in flushing these accumulated solids from the dissolver vessel. A sparging ring used to agitate the solids on the bottom to facilitate flushing from the vessel was found to be subject to damage by the impact from dropped fuel elements.

Consequently, it is an object of the present invention to provide an improved bottom assembly for a dissolver vessel for a nuclear reactor fuel reprocessing system.

It is another object of the present invention to provide a bottom assembly for a dissolver vessel which will permit agitation of accumulated solids, thus facilitating flushing of the solids from the vessel.

BRIEF DESCRIPTION OF THE DRAWINGS

Other objects as well as advantages of the present invention will become apparent upon reading the following description and with reference to the drawings in which.

SUMMARY OF THE INVENTION

In accordance with the present invention, an improved bottom assembly is provided for a nuclear reactor fuel reprocessing dissolver vessel. The bottom assembly includes a shock-absorbing crash plate having a convex upper surface located at the bottom of the dissolver vessel and spaced from the dissolver vessel so as to provvide an annular space between the vessel wall and the crash plate. A sparging ring is located within the annular space and serves to agitate solids which deposit on the bottom of the dissolver vessel and accumulate in the annular space. Inlets and outlets communicating with the annular space permit a fluid entering the inlets to flush the accumulated solids from the vessel through the outlets.

DETAILED DESCRIPTION OF THE INVENTION

Figure 1:
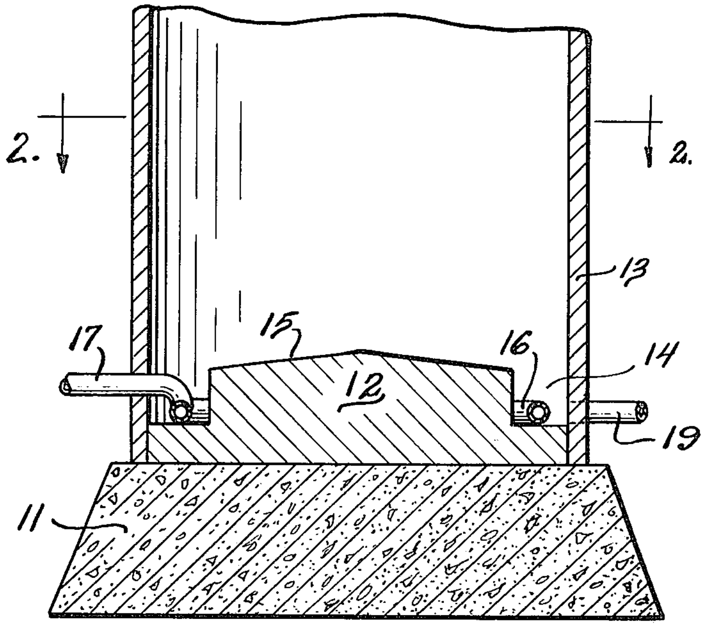
FIG. 1 is a sectional view of a bottom assembly for a dissolver vessel in accordance with the present invention.

A more complete understanding of the improved bottom assembly of the present invention will be obtained from the following detailed description and with reference to the drawings in which the indentical components are identified with the same numeral. The dissolver vessel for dissolution of the nuclear reactor fuel will generally be mounted on a firm and stable base or floor such as represented by concrete block 11 in FIG. 1. Since the invention lies in an improved bottom assembly, only that pertinent portion of the dissolver vessel is illustrated in the drawing. A shock-absorbing crash plate 12 is located at the bottom and within the dissolver vessel and is spaced from the dissolver vessel wall 13 so as to provide an annular space 14 between the crash plate 12 and the dissolver vessel wall 13. While the crash plate can be of a variety of shapes which will primarily depend upon the shape of the dissolver vessel, since the dissolver will generally be a cylinder, it is preferred that the crash plate be an upright cylinder concentric to the cylindrical dissolver vessel wall 13. As can best be seen in FIG. 1, the crash plate 12 has a slightly convex upper surface 15. The convex upper surface 15 of the crash plate 12 facilitates the accumulation of solids into the annular space 14 from which the accumulated solids can be more readily flushed from the dissolver vessel by means which will be more fully described hereinbelow.

Figure 2:
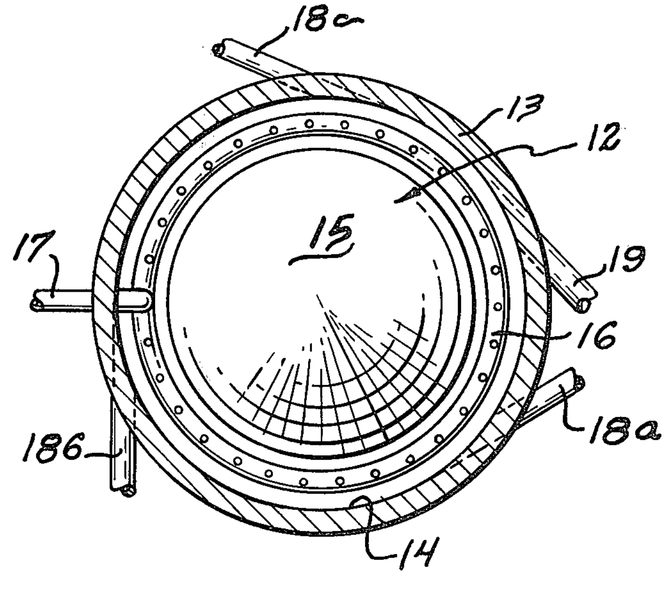
FIG. 2 is a sectional view taken along the line 2—2 of FIG. 1.

A sparging ring 16 is disposed within said annular space 14. Fluids can be pumped through sparging ring inlet 17 through the sparging ring in order to agitate the solids deposited in the bottom of the annular space 14, thus further facilitating the flushing of these accumulated solids from the dissolver vessel. An inlet 18 and an outlet 19 communicate with the annular space 14 and permit the pumping of a fluid through the inlet 18 to flush the solids which have accumulated in the annular space 14 from the dissolver vessel through the outlet 19. It is preferable that there be a plurality of inlets 18 and a plurality of outlets 19, three inlets being shown in FIG. 2 and labeled 18*a*, 18*b* and 18*c*. For sake of clarity in the drawing, only one outlet 19 has been illustrated, although it is preferred that there be more than one such outlet 19, a plurality of inlets and outlets further facilitating the flushing of the solids from the dissolver vessel. It is preferred that the inlets be disposed tangential to the annular space 14, as is illustrated in FIG. 2 by the tangential inlets 18*a*, 18*b* and 18*c*. By so arranging the inlets with respect to the annular space, a circular motion is induced around the annular space 14 when the fluid is pumped through the inlets. The circular motion will facilitate the movement of the accumulated particles around the annular space to the outlets 19 and subsequently from the dissolver vessel. Similarly, it is preferred that the outlet 19 be disposed tangential to the annular space 14 and further that the outlets be oppositely facing the inlets, as is illustrated by outlet 19 in FIG. 2. As can be seen by referring to FIG. 2, a fluid pumped through inlets 18*a*, 18*b* and 18*c* into the annular space 14 will create a clockwise circular motion of the fluid and accumulated particles around the annular space 14 toward the outlet 19 which, when oppositely facing the inlets and tangential to the annular space 14, will provide for easy forcing of the accumulated solids through the outlet 19 and thence from the dissolver vessel.

In a further preferred embodiment of the present invention, the crash plate 12 has a diameter with respect to the diameter of the dissolver vessel such that the width of the annular space 14, that is the distance between the crash plate 12 and the dissolver vessel wall 13, is less than the diameter of the fuel elements which will be dissolved in the dissolver vessel. By making the annular space 14 of a width less than the diameter of the nuclear reactor fuel elements, the possibility of damage to the sparging ring 16 by impact from a falling fuel element is eliminated, as the fuel elements will not be able to fall into annular space 14 to make contact with the sparging ring 16.

It can thus be seen that the bottom assembly of the present invention is an improvement which offers advantages over the bottom assemblies previously used and provides solutions to the problems previously confronted. In operation, the crash plate will serve to absorb the impact of the falling fuel elements and the sparging ring located in the annular space is protected from impact. The solids depositing on the bottom of the dissolver and the convex upper surface of the crash plate will therefore accumulate in the annular space. The fluid pumped through the inlet into the sparging ring serves to agitate these solids, displacing them from the bottom of the annular space and enabling a fluid being pumped into the annular space through the inlets to cause a circular motion around the annular space, pushing the accumulated solids from the dissolver vessel through the outlets.

While the invention has been described with respect to specific embodiments, it should be understood that the invention is not limited to the details given herein but may be modified within the scope of the appended claims.

The embodiments of the invention in which an exclusive property or privilege is claimed are defined as follows:

1. A bottom assembly for a nuclear reactor fuel reprocessing dissolver vessel comprising:

a. a shock-absorbing upright cylindrical crash plate have a slightly convex upper surface disposed within said dissolver vessel at the bottom thereof and spaced from said dissolver vessel wall so as to provide an annular space therebetween, the width of said annular space being less than the diameter of the nuclear reactor fuel elements to be dissolved;

b. a sparging ring disposed within said annular space; and c. inlets and outlets communicating with said annular space to permit a fluid entering through the inlets to flush solids accumulated in the annular space from the vessel through the outlets, said inlets being disposed tangential to said annular space so as to induce a circular motion to the fluid around said annular space, said outlets being disposed tangential to said annular space and oppositely facing said inlets.

* * * * *